United States Patent [19]

Leigh et al.

[11] Patent Number: 5,098,579
[45] Date of Patent: Mar. 24, 1992

[54] PROCESS FOR REMOVING HEAVY METALS AND OTHER IONS FROM AN AQUEOUS SOLUTION

[75] Inventors: Charles H. Leigh; Michel Laurin, both of St. Bruno, Canada

[73] Assignee: Hydro Quebec, Montreal, Canada

[21] Appl. No.: 524,668

[22] Filed: Apr. 23, 1990

Related U.S. Application Data

[63] Continuation of Ser. No. 239,635, Sep. 2, 1988, abandoned, which is a continuation-in-part of Ser. No. 14,777, Feb. 13, 1987, abandoned.

[51] Int. Cl.$^5$ .................................................. C02F 1/52
[52] U.S. Cl. ..................................... 210/724; 210/904; 210/906; 210/911; 210/912; 210/913; 210/914
[58] Field of Search ............... 210/702, 720, 723, 726, 210/738, 912-914, 724, 904, 906, 911

[56] References Cited

U.S. PATENT DOCUMENTS 3,791,520  2/1974  Nieuwenhuis ..................... 210/283

FOREIGN PATENT DOCUMENTS 836623  3/1970  Canada .

Primary Examiner—Ivars Cintins
Attorney, Agent, or Firm—Foley & Lardner

[57] ABSTRACT

Disclosed is a method for treating in a continuous manner an aqueous solution containing ions of a given type in order to remove these ions from the solution. According to this method, the aqueous solution containing the ions to be removed is first neutralized if it is acidic. Then, it is contacted with a metal salt which is sparingly soluble in water and has a very strong affinity to react with the ions to be removed to form therewith another salt which is insoluble in water, for a period of time sufficient to allow this other salt to be formed and precipitate. This method is very efficient and can be used, by way of example, for removing chromium ions from an industrial waste water, using barium carbonate as sparingly soluble salt.

8 Claims, 1 Drawing Sheet

PROCESS FOR REMOVING HEAVY METALS AND OTHER IONS FROM AN AQUEOUS SOLUTION

CROSS-REFERENCE TO RELATED APPLICATIONS

This application is a continuation of application Ser. No. 07/239,635, filed Sept. 2, 1988, which is a continuation-in-part of application Ser. No. 07/014,777, filed on Feb. 13, 1987, both now abandoned.

BACKGROUND OF THE INVENTION a) Field of the Invention

The present invention relates to a method for treating in a continuous manner an aqueous solution such as an industrial waste water, containing ions of a given type to be removed, especially heavy metal ions, in order to remove these ions from the solution.

b) Brief Description of the Prior Art

Numerous methods are already known and commonly used for treating ion-loaded aqueous solutions such as chromium plating solutions, mercury-polluted waters, contaminated brines and the like, in order to remove the polluting or deleterious ions contained in these solutions to make them usable, drinkable, reusable and/or recyclable.

These methods which are for the most part used in the industry for removing heavy metal ions such as mercury, cadmium, copper, zinc, nickel, cobalt or chromium in solution in waste waters, can be generally classified as follows:

1) methods in which the heavy metal ions are removed by ion exchange or adsorption (see U.S. Pat. Nos. 3,728,257; 4,167,481 and 4,481,087; see also Canadian patents Nos. 1,011,476 and 1,084,181);
2) methods in which the aqueous solution to be treated is floculated with a suitable agent and allowed to settle, and
3) methods in which the heavy metal ions are removed by direct precipitation with a salt dissolved in the solution (see U.S. Pat. Nos. 3,493,328; 3,552,917; 3,969,246; 4,054,517; 4,338,200; 4,401,573 and 4,465,598; see also Canadian patent No. 836,623).

OBJECTS OF THE INVENTION

A first object of the present invention is to provide a new method for treating, in a continuous manner, an aqueous solution, which can be, for example, an industrial waste water, in order to remove therefrom ions of a given type, such as heavy metal ions, in which the ions to be removed are made insoluble not by direct precipitation with a salt already dissolved in the solution and capable of reacting in solution with said ions to form an insoluble compound, but rather by direct reaction with a metal salt which is sparingly soluble in water and has a very strong afinity to react with the ions to be removed to form therewith another salt which is insoluble in water.

Another object of the invention is to provide a method for treating, in a continuous manner, an aqueous solution containing ions of a given type in order to remove said ions therefrom, which method can be carried out in a very direct manner without requiring substantial acidification of the solution prior to treating it. In accordance with the invention, it is even compulsory to neutralize the solution to be treated if it is acidic or, more generally, not neutral prior to contacting this solution with the sparingly soluble salt in order to avoid that the sparingly soluble salt used for the removal and the insoluble salt formed during the reaction become soluble as it often occurs at low pH.

A further object of the invention is to provide a method for treating in a continuous manner an aqueous solution containing ions of a given type in order to remove said ions, which method is very simple to carry out at low cost.

SUMMARY OF THE INVENTION

The method according to the invention is intended to be used for treating any aqueous solution containing ions to be removed selected from the group consisting of:

ions of the following metals: Al, Ag, As, Au, Ba, Be, Bi, Cd, Ce, Co, Cr, Cu, Fe, Hg, Mg, Mn, Mo, Ni, Pb, Pd, Pt, Sb, Se, Sn, Th, Ti, and Zn; and the following anions: $CN^-$, $CrO_4^{--}$, $Cr_2O_4^{--}$, $PO_4^{--}$ The method according to the invention which is advantageously carried out in a continuous manner, is characterized in that it comprises the steps of:

a) neutralizing the aqueous solution containing the ions to be removed if this solution is acidic; and
b) passing the optionally neutralized solution through a container containing a metal salt that is sparingly soluble in water and thus will slightly dissolve in the aqueous solution to form a saturated solution of ions of the sparingly soluble salt that will permanently react with the ions to be removed to form therewith another salt which is insoluble in water and will precipitate, such a precipitation disturbing the equilibrium between the dissolved ions of the sparingly soluble salt and said sparingly soluble salt in undissolved form and thus causing more of said metal salt to dissolve and react with the ions to be removed.

said optionally neutralized solution being passed through the container at such a speed as to provide contact of the ions to be removed with the sparingly soluble salt for a period of time sufficient to allow the other salt to be formed and precipitate.

The method according to the invention is also characterized in that the ions to be removed, the sparingly soluble salts used for this removal and the other insoluble salts formed during the reaction are respectively selected from the groups of ions and salts listed in Table I hereinafter.

By "sparingly soluble salt", there is meant a salt which is very slightly soluble into water and more particularly a salt whose solubility in water at ambient temperature is equal to or lower than 2,000 ppm. However, in accordance, with the invention, use will preferably be made of sparingly soluble salts whose solubility is much lower than the above mentioned limit of 2,000 ppm preferably is in the range of 1 to 210 ppm at ambient temperature in an aqueous solution.

Preferably, use will be made of $CaCO_3$, $BaCO_3$, $BaC_2O_4$ or of a mixture of $CaCO_3$ and $Mg(OH)_2$, as these salts are easily available at low cost and particularly efficient against a great number of metal ions. The use of $Mg(OH)_2$ as springly soluble salt is particularly interesting as this salt is basic and thus acts not only as an "ion-remover" but also as a neutralizing agent, thereby making it possible to carry out steps (1) and (2) of the method according to the invention simultaneously.

The concentration of ions to be removed in the aqueous solution to be treated is not essential and may vary within a very broad range (from a few ppm up to thousands of ppm), provided that the period of contact between the ions to be removed and the sparingly soluble salt in the container is sufficient to allow the insoluble salt to be formed and to precipitate.

If, for example, the concentration of ions to be removed is very high, efficient treatment of the aqueous solution will be easily achieved by either increasing the size of the container and amount of sparingly soluble salt contained therein and/or reducing the flow speed of the aqueous solution through the container to make it sure that all the ions to be removed contact the sparingly insoluble salt and react therewith.

In other words, there is no maximum value to the concentrations of ions to be removed in the aqueous solution to be treated except the one that may be imposed upon by the amount of solution to be treated within a given period of time and the size of the equipment available on the premises.

The method according to the invention can be reduced into practice by using an apparatus comprising;
- a container provided with an inlet and an outlet and containing a given amount of the metal salt which is sparingly soluble in water and has a greater affinity to react that the ions to be removed to form therewith the other salt which is insoluble in water;
- means such as a variable pump, for passing the aqueous solution to be treated through the container at such a speed as to allow the ions contained in the solution to contact the sparingly soluble salt and react therewith to form another insoluble salt;
- metering means for injecting a given amount of either an acid or a base into the aqueous solution to neutralize the same before it enters the container; and
- means such as a grid, at the outlet of the container for preventing the sparingly soluble and insoluble salts from being flushed out of this container when the aqueous solution is passing.

GENERAL DESCRIPTION OF THE INVENTION

Figure 1:
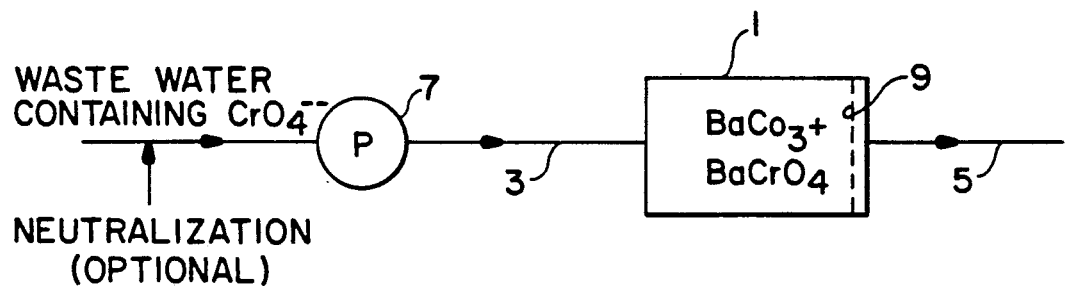
FIG. 1 is schematic representation of an apparatus for use in accordance with the invention for continuously treating an aqueous solution containing ions to be removed therefrom.

The invention is based on the fact that any metal salt which is sparingly soluble in water and has a very strong affinity to react with some ions to be removed to form therewith another salt which is insoluble in water, will, when contacted with the aqueous solution to be treated, slightly dissolve in this solution to form a saturated solution of ions which, in turn, will permanently react with the ions to be removed to form an insoluble salt. The precipitation of this insoluble salt will, in turn, disturb the equilibrium between the dissolved ions of the sparingly soluble salt and the solid salt, and thus cause more of this salt to dissolve and react with the ions to be removed.

According to the well known theory of ARRHENIUS, any salt behaving as an electrolyte in solution at moderate dilution, forms a system in equilibrium containing, on the one hand, the undissociated salt per se and, on the other hand, its constituting ions. Of course, this system behaves in conformity with the well known law of mass action. Thus, any electrolyte AB in solution will undergo ionization and be in equilibrium in this solution with its ions $A^+$ and $B^-$ according to the following equation:

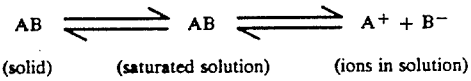

(solid)   (saturated solution)   (ions in solution)

If we apply the law of mass action to the ions which are so formed, we have:

$$\frac{c_{A+} \cdot c_{B-}}{c_{AB}} = k$$

wherein k is the ionization constant.

If, by any means, the concentration of either ion in the solution is decreased, the equilibrium will be disturbed and some of the undissociated salt will dissolve to maintain the ionic concentration.

In accordance with the invention, this well known phenomenon is used to remove some very specific ions, especially heavy metal ions dissolved in an aqueous solution. For the purpose of simplification, reference will now be made to chromium ($Cr^{6+}$) only as such ions to be removed from a solution, and to $BaCO_3$ as sparingly soluble salt to be used for removing it. It should however be understood that the invention is by no way restricted to this compound.

As is known, $BaCO_3$ is almost insoluble but not quite in water (its solubility being 20 ppm at ambiant temperature). If a solution of chromium in water is passed into a reaction vessel containing solid $BaCO_3$, the latter will slightly dissolve in water and one of its ions, namely $Ba^{++}$, will react with chromium as follows:

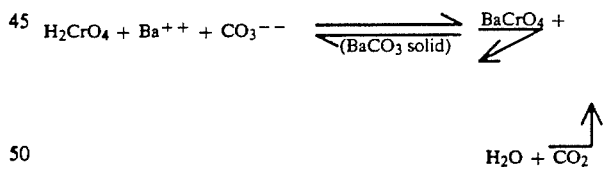

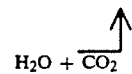

As can be seen in this equation, chromium is precipitated as barium chromate. As the latter is almost insoluble (its solubility being 3 ppm), the barium ion concentration will be reduced as barium chromate precipitates, thereby causing the dissolution of more of the undissolved $BaCO_3$ to maintain the equilibrium of this salt with its ions according to the equation:

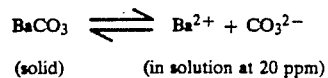

(solid)   (in solution at 20 ppm)

The above equations make it clear that it is possible to remove chromium from an aqueous solution near neutrality, by reacting it with nearly insoluble barium carbonate to form barium chromate, since the reactive barium ions will be commonly maintained to a concentration of 20 ppm according to the law of mass action. Therefore, it becomes possible to remove chromium from an aqueous solution by merely reacting it with a sparingly or slightly soluble salt such as $BaCO_3$, $FeCO_3$ (solubility 17 ppm), or $MgCO_3$ (solubility 100 ppm), which will, on reaction with the chromium, yield an insoluble salt.

This method is particularly interesting as it can be used for purifying industrial waste waters from ions for these following metals:

Al, Ag, As, Au, Ba, Be, Bi, Cd, Ce, Co, Cr, Cu, Fe, Hg, Mg, Mn, Mo, Ni, Pd, Pt, Sb, Se, Sn, Sr, Th, Ti, Zn and Zr.

This method can also be used for purifying waters from the following anions:

$CrO_4^{--}$, $Cr_2O_4^{--}$, $CN^-$, $PO_4^{--}$,

As aforesaid, the selection of a sparingly soluble salt must of course be carried out as a function of the respective affinity of this salt for the ions to be removed and its ability form therewith another salt which is insoluble. The following Table I gives a list of the sparingly soluble salts that may be selected as a function of the ions to be removed. This Table I also gives the insoluble salts that are obtained during the reaction.

TABLE I

| ION TO BE REMOVED | SPARINGLY SOLUBLE SALT USEFUL FOR THE REMOVAL | INSOLUBLE SALT FORMED DURING THE REACTION |
|---|---|---|
| $CN^-$ | CuCl (62 ppm) | $Cu(CN)_2$ (i) |
| | $CuC_2O_4 \cdot \frac{1}{2}H_2O$ (25 ppm) | $Cu(CN)_2$ (i) |
| | $NiCO_3$ (93 ppm) | $Ni(CN)_2$ (i) |
| | $ZnCO_3$ (10 ppm) | $Zn(CN)_2$ (i) |
| $PO_4^{--}$ | $CaCO_3$ (20 ppm) + $Mg(OH)_2$ (9 ppm) | $3Ca_3(PO_4)_2 \cdot Ca(OH)_2$ (i) |
| Al | $Mg(OH)_2$ (9 ppm), | $Al(OH)_3$ (i) |
| | CaO (2000 ppm) | AlO(OH)(i) |
| | $Ca_3(PO_4)_2$ (20 ppm) | $Al(PO_4)$(i) |
| | $Ba C_2O_4$ (93 ppm), | $Al_2(C_2O_4)_3 \cdot 4H_2O$ |
| | $CuC_2O_4$ (6.7 ppm), | |
| | $MgC_2O_4 \cdot 2H_2O$ (700 ppm) | |
| $Ag^+$ | CuCl (62 ppm) | AgCl (0.89 ppm) |
| | CaS (210 ppm) | $Ag_2S$ (0.14 ppm) |
| As | CaS (210 ppm) | $As_2S_2$(i), |
| | | $As_2S_5$ (1.4 ppm) |
| | | $As_2$ (0.5 ppm) |
| $Au^+$ and $Au^{+++}$ | CaS (210 ppm) | $Au_2S$(i) $Au_2S_3$(i) |
| $Ba^{++}$ | $Ca_3(PO_4)_2$ (20 ppm) | $Ba_3(PO_4)_2$(i) |
| | $CaSiO_3$ (95 ppm) | $BaSO_4$ (0.2 ppm) |
| | BaCO (20 ppm), $CaCO_3$ (15 ppm) | $(BeCO_3 + Be(OH_2))$(i) |
| $Be^{++}$ | $BaCO_3$ (20 ppm), $CaCO_3$ (15 ppm) | $(BeCO_3 + Be(OH_2))$(i) |
| | $FeCO_3$ (67 ppm), $MgCO_3$ (100 ppm) | |
| | $MnCO_3$ (65 ppm) | |
| | $CaSO_4$ (2000 ppm) | $BeSO_4$(i) |
| $Bi^{++}$ | $BaCO_3$ (20 ppm), $CaCO_3$ (15 ppm) | $Bi_3O_2CO_3$(i) |
| | $FeCO_3$ (67 ppm), $MgCO_3$ (100 ppm) | |
| | $MnCO_3$ (65 ppm) | |
| | $Mg(OH)_2$ (9 ppm), CaO (2000 ppm) | $Bi(OH)_3$ (1.4 ppm) |
| | CaS (210 ppm) | $Bi_2S_3$ (0.018 ppm) |
| $Cd^{++}$ | $BaCO_3$ (20 ppm), $CaCO_3$ (15 ppm) | $CdCO_3$(i) |
| | $FeCO_3$ (67 ppm), $MgCO_3$ (100 ppm) | |
| | $MnCO_3$ (65 ppm) | |
| | $Ca_3(PO_4)_2$ (20 ppm) | $Cd_3(PO_4)_2$(i) |
| | CaS (210 ppm) | CdS (1.3 ppm) |
| $Ce^{+++}$ | $BaCO_3$ (20 ppm), $CaCO_3$ (15 ppm) | $Ce_2(CO_3)_3 \cdot 5H_2O$(i) |
| | $FeCO_3$ (67 ppm) $MgCO_3$ (100 ppm) | |
| | $MnCO_3$ (65 ppm) | |
| | $Ca_2(PO_4)_2$ (20 ppm) | $CePO_4$(i) |
| | CaS (210 ppm) | $Ce_2S_3$(i) |
| $Co^{++}$ | $BaCO_3$ (20 ppm), $CaCO_3$ (15 ppm) | $CoCO_3$(i) |
| | $FeCO_3$ (67 ppm) $MgCO_3$ (100 ppm) | $2CoCO_3 \cdot Co(OH)_2 \cdot H_2O$(i) |
| | $MnCO_3$ (65 ppm) | |
| | $Mg(OH)_2$ (9 ppm) | $Co(OH)_2$ (3.2 ppm) |
| | $BaSO_3$ (200 ppm), $CaSO_3$ (43 ppm) | $CoSO_3 \cdot 5H_2O$(i) |
| | CaS (210 ppm) | $CoS_2$(i) |
| | | CoS (4 ppm) |
| $Cr^{+6}$ ($CrO_4^=$) | $BaCO_3$ (20 ppm) | $BaCrO_4$ (3 ppm) |
| $Cr^{+3}$ | $BaCO_3$ (20 ppm), $BaC_2O_4$ (93 ppm) | $BaO \cdot 4Cr_2O_4$(i) |
| | $BaSO_3$ (200 ppm) | |
| ($Cr_2O_4^=$) | $CaCO_3$ (20 ppm), CaO (2000 ppm) | $CaCr_2O_4$(i) |
| | $Ca_3(PO_4)_2$ (20 ppm), $CaCrO_4$ (6.7 ppm) | |
| | $CaSiO_3$ (95 ppm), $CaSO_4$ (2000 ppm) | |
| | $CaSO_3$ (43 ppm), CaS (210 ppm) | |
| | $FeCO_3$ (67 ppm), $Fe_2C_2O_4 \cdot 2H_2O$ (220 ppm) | $FeCr_2O_4$(i) |
| | $MgCO_3$ (100 ppm), Mg(OH) (9 ppm) | $MgCr_2O_4$(i) |
| | $Mg(C_2O_4 \cdot 2H_2O$ (700 ppm) | |
| | $MnCO_3$ (65 ppm) | $MnCr_2O_4$(i) |
| $Cr^{+3}, Cr^{+2}$ | CaS (210 ppm) | CrS(i) |

TABLE I-continued

| ION TO BE REMOVED | SPARINGLY SOLUBLE SALT USEFUL FOR THE REMOVAL | INSOLUBLE SALT FORMED DURING THE REACTION |
|---|---|---|
| | | $Cr_2S_3(i)$ |
| $Cu^+, Cu^{++}$ | $BaCO_3$(20 ppm), $CaCO_3$(15 ppm) | $Cu_2CO_3(i)$ |
| | $FeCO_3$(67 ppm) | |
| | $MgCO_3$(100 ppm), $MnCO_3$(65 ppm) | $CuCO_3.Cu(OH)_2(i)$ |
| | $Mg(OH)_2$(9 ppm) | $Cu(OH)_2(i)$ |
| | CaO(2000 ppm) | $Cu(OH)_2(i)$ |
| | $BaSO_3$(200 ppm), $CaSO_3$(43 ppm) | $Cu_2SO_3.H_2O(i)$ |
| | | $Cu_2SO_3.CuSO_3.H_2O(i)$ |
| | CaS(210 ppm) | $Cu_2S(i)$ |
| | | CuS(0.3 ppm) |
| $Fe^{++}, Fe^{+3}$ | $Mg(OH)_2$(9 ppm) | $Fe(OH)_2$ (1,5 ppm) |
| | CaO(2000 ppm) | $Fe(OH)_2$ (1,5 ppm) |
| | $Ca_3(PO_4)_2$ (20 ppm) | $Fe_3(PO_4)_2$ $8H_2O(i)$ |
| | CaS(210 ppm) | $FeS_2$(5 pppm) |
| | | FeS (6 ppm) |
| $Hg^+, Hg^{++}$ | $BaCO_3$(20 ppm), $CaCO_3$(15 ppm), $FeCO_3$(67 ppm) | $Hg_2CO_3$(0.045 ppm) |
| | $MgCO_3$(100 ppm), $MnCO_3$(65 ppm) | |
| | CuCl (62 ppm) | Hg $Cl_2$(2 ppm) |
| | C S(210 ppm) | $Hg_2S(i)$ |
| | | HgS(i) |
| $Mg^{++}$ | $Ca_3(PO_4)_2$(20 ppm) | $Mg_3(PO_4)_2(i)$ |
| $Mn^{++}$ | $Ca_3(PO_4)_2$(20 ppm) | $Mn_3(PO_4)_2(i)$ |
| | CaS(210 ppm) | $3MnS.H_2O$(6 ppm) |
| | | MnS(5 ppm) |
| Mo | CaS(210 ppm) | $MoS_2(i)$ |
| | | $Mo_2S_5.3H_2O(i)$ |
| | | $Mo_2S_3(i)$ |
| | | $MoS_4(i)$ |
| $Ni^{++}$ | $BaCO_3$(20 ppm), $CaCO_3$(15 ppm), $FeCO_3$(67 ppm) | $2NiCO_3.3Ni(OH)_2.4H_2O(i)$ |
| | $MgCO_3$(100 ppm), $MnCO_3$(65 ppm) | |
| | $Ca_3(PO_4)_2$(20 ppm) | $Ni_3(PO_4)_2.5H_2O(i)$ |
| | Ba $C_2O_4$(93 ppm), $CaC_2O_4$(6.7 ppm) | Ni $C_2O_4.2H_2O(i)$ |
| | $BaSO_3$(200 ppm), $CaSO_3$(43 ppm) | $NiSO_3.6H_2O(i)$ |
| | Ca S(210 ppm) | NiS(3.6 ppm) |
| | | $Ni_3S_2(i)$ |
| | | $Ni_3S_4(i)$ |
| $Pb^{++}$ | $BaCO_3$(20 ppm), $CaCO_3$(15 ppm), $FeCO_3$(67 ppm) | $2PbCO_3.Pb(OH)_2(i)$ |
| | Mg $CO_3$ (100 ppm), $MnCO_3$(65 ppm) | " |
| | $Ca_3(PO_4)_2$(20 ppm) | $Pb_3(PO_4)_2$(0.14 ppm) |
| | $BaC_2O_4$(93 ppm) $CaC_2O_4$(6.7 ppm) | $PbC_2O_4$(1.6 ppm) |
| | $BaSO_3$(200 ppm), $CaSO_3$(43 ppm) | $PbSO_3(i)$ |
| $Pd^{+n}$ | CaS(210 ppm) | $PdS_2(i)$ |
| n = +1, +2, +4 | | PdS(i) |
| | | $Pd_2S(i)$ |
| $Pt^{+n}$ | $Mg(OH)_2$(9 ppm) | $Pt(OH)_2(i)$ |
| n = +2, +4, +3 | | $Pt(OH_2.2H_2O(i)$ |
| | CaO(2000 ppm) | $Pt(OH)_2(i)$ |
| | | $Pt(OH)_2.2H_2O(i)$ |
| | CaS(210 ppm) | $PtS_2(i)$ |
| | | PtS(i) |
| | | $Pt_2S_3(i)$ |
| $Sb^{+n}$ | $CaSO_4$(2000 ppm) | $Sb_2(SO_4)_3(i)$ |
| n = +3, +5 | CaS(210 ppm) | $Sb_2S_4(i)$ |
| | | $Sb_2S_3$(1.8 ppm) |
| $Se^{++}$ | CaS(210 ppm) | SeS(i) |
| $Sn^{+n}$ | $Ca_3(PO_4)_2$(20 ppm) | $Sn_3(PO_4)_2(i)$ |
| n = +2, +4 | CaS(210 ppm) | SnS(i) |
| | | $SnS_2$(2 ppm) |
| $Sr^{+2}$ | $Ca_3(PO_4)_2$(20 ppm) | SrHPO_4(i) |
| | CaS(210 ppm) | SrS(i') |
| $Th^{+4}$ | $BaCO_3$(20 ppm), $CaCO_3$(15 ppm), $FeCO_3$(6.7 ppm) | $Th(CO_3)_2(i)$ |
| | $MgCO_3$(100 ppm), $MnCO_3$(65 ppm) | |
| | Ba $C_2O_4$(93 ppm), $CuC_2O_4$(6.7 ppm) | $Th(C_2O_4)_2(i)$ |
| | CaS(210 ppm) | $ThS_2(i)$ |
| $Ti^{+n}$ | CaS(210 ppm) | TiS(i) |
| n = +2, +3 | | $Ti_2S_3(i)$ |
| $Zn^{+2}$ | $Ca_3(PO_4)_2$(20 ppm) | $Zn_3(PO_4)_2(i)$ |
| | | $Zn_3(PO_4)_2.8thO(i)$ |
| | | $Zn_3(PO_4)_2.4H_2O(i)$ |
| | CaS(210 ppm) | Zns(7 ppm) |
| | | $ZnS.H_2O(i)$ |

(i) = insoluble

The process according to the invention can be carried out in a continuous manner, using an apparatus as shown in FIG. 1, comprising a container 1 provided with an inlet 3 and an outlet 5. An adjustable outflow pump 7 is provided upstream the inlet 3 of the container to pump the aqueous solution to be treated and pass it through the container 1. In FIG. 1, this solution is disclosed as being an industrial waste water containing chromium ions. The container 1 is designed to contain a given amount of a metal salt which is sparingly soluble in water and has a very strong affinity to react with the ions to be removed to form therewith another salt which is insoluble in water. In the particular case of chromium, this sparingly soluble salt may be $BaCO_3$. Means 9 which may consist of a wire mesh, a grid or any other kind of filter, is provided close to or in the outlet 5 of the container, in order to prevent the sparingly soluble $BaCO_3$ and the insoluble salt $BaCrO_4$ formed inside the container 1 from being flushed out of this container 1 when the aqueous solution is passed therein by the pump 7.

The sparingly soluble salt $BaCO_3$ may be in the form of a powder. It may also be supported and "processed" to form a filter bed, a fluidized bed, a slurry bed or a stirred bed. Depending on the amount of $BaCO_3$ and its form in the container, the flow rate of the pump 7 must be adjusted so that the chromium ions in solution in the industrial waste water to be treated, have enough time to react with $BaCO_3$ to form $BaCrO_4$. In other words, this flow rate must be adjusted to be slow enough to allow complete reaction with the barium solution, as the barium carbonate slowly dissolves. As the barium ions are removed by reaction with chromium to form barium chromate, more barium carbonate will be dissolved to maintain the equilibrium.

During this process, there is never any excess of barium in solution since the solubility of barium carbonate is only 20 ppm and since more barium ions will be formed and "added" to the solution passing through the container only when the barium ions already formed and dissolved in the solution are removed by precipitation as barium chromate.

The fact that it is not compulsory that the barium carbonate be previously dissolved by addition of acid, or be added in substantial excess in the form of barium nitrate, chloride or acetate as disclosed in the prior art, is an essential point of the invention. Indeed, as there is no excess of barium ions in the solution treated according to the invention, there is also no barium precipitation downstream from the reaction zone and thus no removal problem associated with such a downstream precipitation.

In practice, if the concentration of chromium ions in the chromium solution is much higher than that of the saturated barium ions in solution (20 ppm), one must allow a longer reaction time to provide sufficient barium ions in solution, by using a container having a larger reaction volume which will contain more barium ions in total, even though the solubility of the barium carbonate is very slight.

The precipitate which is formed during the reactor and which contains for the most part the insoluble salt that is formed during the reaction and contains the contaminating metal ions to be removed, may be recovered and, if desired, threated to recover the contaminating ions as metal or metal salts. Of course, the industrial waste water which has been so treated, may be recycled if desired.

It is worth mentioning that the metal according to the invention can be applied to industrial waste liquors wherein the metal ions to be removed are contained in an organic solution. In such a case, the metal ions may be extracted after previous extraction from the organic solution with water or any other extractant.

It is also worth mentioning that the method according to the invention can be used for removing different types of ions from a same aqueous solution, by simply positioning a plurality of containers as shown in FIG. 1 downstream from the pump, each container containing a sparingly soluble metal salt suitable for removing a given type of ion. Thus, it becomes possible to remove several ions in series, using a plurality of "cartridges" positioned in different containers mounted in series at the outlet of the pump.

Alternatively, use can be made of a mixture of two or more sparingly soluble salts in the same container to remove two or more ions simultaneously. Mixtures of $CaCO_3+Mg(OH)_2$ or $CaCO_3+Mg(OH)_2+BaCO_3$ have proved to be particularly efficient and interesting when used in the same container, because:

1- these salts react with most of the metal ions, thereby making it possible to remove in one "step" different metal ions such as Al, Cu, Fe, Ni, Pb and Zn;

2- each of these salts is easily available at low cost; and

3- $Mg(OH)_2$ is not only active as sparingly soluble salt for use to remove ions such as Al, Cu, Fe, etc. but also as neutralizing agent because of its basicity.

Thus when use is made of $Mg(OH)_2$, steps 1 and 2 of the method according to the invention becomes "combined".

It is finally worth mentioning that the method according to the invention runs away from the general teaching of the prior art such as, for example, Canadian patent No. 836,623. In this patent, there is disclosed and claimed that the addition of an excess of barium carbonate in solid form to a chromium-ion containing solution is ineffective to precipitate all the chromium ions from that solution as barium chromate (see page 2, lines 2 to 5). In full contrast, it has been discovered according to the invention that barium carbonate in solid form will reduce the concentration of chromium in a neutral, chromium ion-containing solution down to 0.7 ppm.

To solve the alleged problem set forth in the preamble of this Canadian patent, acid is added to convert the solid barium carbonate present into hydrochloride or nitrate which are very soluble and pass into solution. In full contrast, it is compulsory according to the invention not to acidify the solution nor to use direct precipitation by addition of an excess of barium carbonate which is then dissolved in acid (HCl, $HNO_3$, acetic acid, etc. . . .). In other words, the process disclosed in this Canadian patent No. 836,623 depends upon dissolving $BaCO_3$ by addition of an acid in order to give a high concentration of barium in the solution in the form of barium chloride or barium nitrate. Then, the barium salt solution which is so formed will react with the chromium ions to give barium chromate, provided however that the solution is made neutral. This method is completely different from the method according to the invention both in its "approach" and the way it is carried out.

Similarly, U.S. Pat. No. 3,969,246 which is very illustrative of the prior art in this field, discloses a method whereby chromium is removed from a solution by direct precipitation with barium carbonate. Once again, the barium carbonate is mixed and dissolved in acetic acid in an aqueous media prior to adding this mixture to the chromium solution. The pH of the mixture is ranging from 4.5 to 4.7, i.e. very acidic, thereby making it clear that barium carbonate is first converted into barium acetate and then used as such to precipitate the chromate ions. In full contrast, the method according to the invention consists in allowing the solution containing the chromium ions to contact barium carbonate at a pH of about 7. Barium carbonate is used as such in solid form and no excess of barium ion is present nor is necessary in the chromate ion containing solution.

EXAMPLE 1

In an apparatus as shown in FIG. 1 of the drawings, 800 liters of an aqueous solution containing about 30 g of $CrO_3$ were passed at a flow rate of 5 liters per hour. The container of the apparatus contained 100 g of $BaCO_3$. The residence time of the solution within the container was of about 25 minutes.

Figure 2:
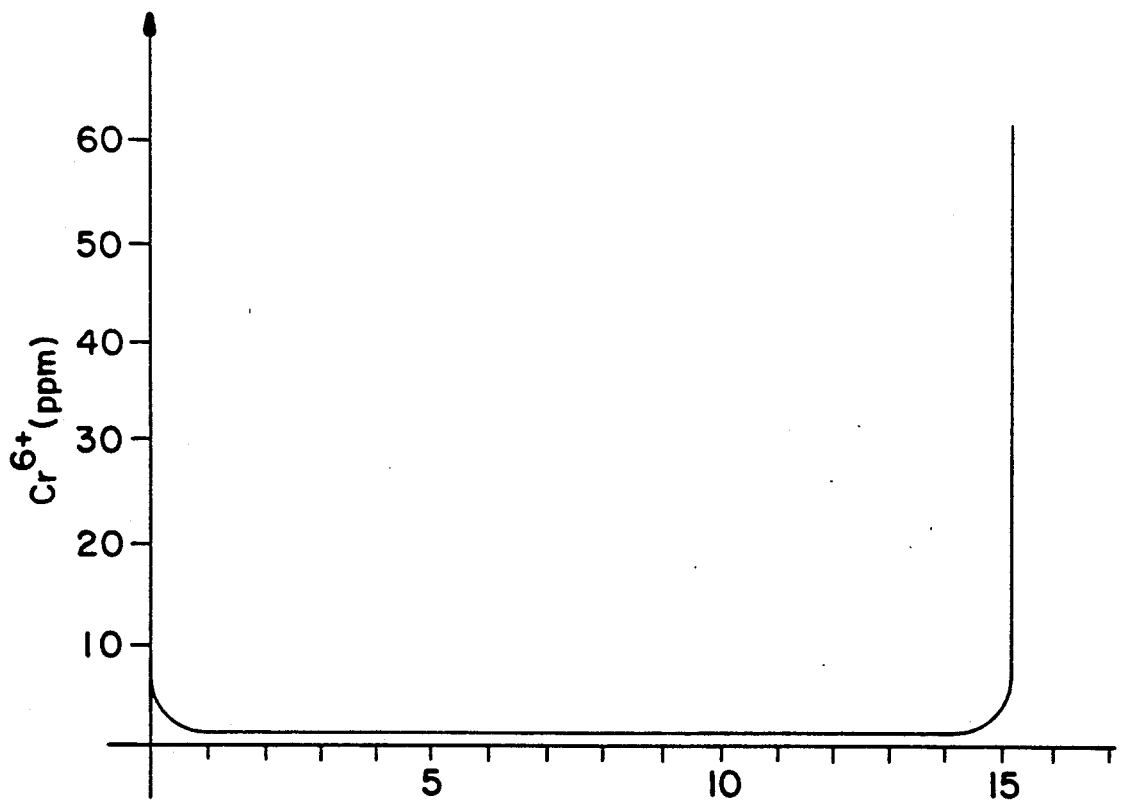
FIG. 2 is a curve reporting the results of a test carried out with an aqueous solution containing chromium, which curve gives the concentration of $Cr^{6+}$ (expressed in ppm) as a function of time (expressed in days).

The concentration of chromium ions in the aqueous solution at the outlet of the container was measured at given intervals and the results of this measurements are reported in FIG. 2.

As can be seen, after a stabilization period of about one day, the concentration of chromium ions in the aqueous solution at the outlet of the container dropped to a very low value of about 0.7 ppm. This low concentration remained as such for more than 15 days, after which, upon saturation of the filtering bed of $BaCO_3$ with $BaCrO_4$, the amount of chromium ions in solution at the outlet of the container started to increase rapidly and reached its original concentration (50 ppm) in the solution to be treated.

This test clearly shows that the method according to the invention works in a very efficient manner and can be used on an industrial scale.

EXAMPLES 2 TO 12

Other tests were carried out on industrial effluents and waste waters of different sources, using substantially the same apparatus as shown in FIG. 1 and the same methodology as disclosed in example 1.

The following TABLE II gives:
1- the type of industry from which originated the waste waters that were treated;
2- the kind of metal(s) or anions that were to be removed in each case;
3- the original concentrations of these metal(s) or anions in the waste water before treatment;
4- the same concentrations after treatment;
5- the flow rate; and
6- the kind of sparingly soluble salts used for the treatment.

TABLE II

| Ex. | INDUSTRY | IONS TO BE REMOVED | ORIGINAL CONCENTRATION mg/l | FINAL CONCENTRATION mg/l | FLOW RATE l/mn | SPARINGLY SOLUBLE SALT USED FOR TREATMENT |
|---|---|---|---|---|---|---|
| 2 | electronics | Ni | 10 | N.D. | 480 | $CaSO_3$ |
|  |  | Cu | 28 | N.D. |  |  |
|  |  | Pb | 6 | N.D. |  |  |
|  |  | Sn | 5 | N.D. |  |  |
| 3 | electronics | Ni | 16 | N.D. | 360 | $CaSO_3$ |
|  |  | Cu | 45 | N.D. |  |  |
|  |  | Pb | 10 | N.D. |  |  |
|  |  | Sn | 8 | N.D. |  |  |
| 4 (see note 1) | deleterious waste water disposal | Al | 19.4 | 0.3 | 200 |  |
|  |  | Cu | 42.7 | N.D. |  | $CaCO_3 + Mg(OH)_2$ |
|  |  | Fe | 33.6 | 0.2 |  |  |
|  |  | Ni | 23.0 | N.D. |  |  |
|  |  | Pb | 2.7 | N.D. |  |  |
|  |  | Zn | 3.4 | 1.0 |  |  |
|  |  | $CN^-$ | 11.0 | 0.1 |  | CuCl |
|  |  | phenol | 29.0 | 0.1 |  | CuCl |
| 5 | acidic etching | Fe | 95.5 | N.D. | 600 | $CaCO_3 + Mg(OH)_2$ |
|  |  | Pb | 4.3 | N.D. |  |  |
|  |  | Zn | 54.2 | N.D. |  |  |
| 6 (see note 2) | manufacture of dyes for paints | Cr | 54.5 | 0.2 | 184 1 | $BaC_2O_4$ |
|  |  | Pb | 25.8 | N.D. | 340 | $CaCO_3 + Mg(OH)_2$ |
|  |  | Zn | 400 | 1.7 | 56 | $CaCO_3 + Mg(OH)_2$ |
|  |  | Sr | 900 | 3.0 | 56 | $BaC_2O_4$ |
| 7 (see note 2) | plating | Cr | 300 | 0.2 | 80 | $BaCO_3$ |
|  |  | Ni | 35 | N.D. | 200 | $CaCO_3 + Mg(OH)_2$ |
|  |  | Zn | 33 | N.D. | 200 | $CaCO_3 + Mg(OH)_2$ |
| 8 (see note 2) | plating | Cr | 104 | 0.2 | 4 | $BaCO_3$ |
|  |  | Cu | 30 | N.D. | 20 | $CaCO_3 + Mg(OH)_2$ |
|  |  | Ni | 150 | N.D. | 28 | $CaCO_3 + Mg(OH)_2$ |
|  |  | Zn | 30 | N.D. | 28 | $CaCO_3 + Mg(OH)_2$ |
|  |  | $CN^-$ | 240 | N.D. | 28 | CuCl |
| 9 (see note 1) | plating | Cr | 32.8 | 0.2 | 100 | $BaCO_3$ |
|  |  | Ni | 24.0 | N.D. |  | $CaCO_3 + Mg(OH)_2$ |
|  |  | Zn | 8.5 | N.D. |  | $CaCO_3 + Mg(OH)_2$ |
|  |  | $CN^-$ | 177 | N.D. |  | CuCl |
|  |  | Cu | 168 | N.D. |  | $CaCO_3 + Mg(OH)_2$ |
| 10 | electronics | Cu | 60 | N.D. | 100 | $CaCO_3$ |
| 11 (see note 1) | plating | Cr | 10 | 0.2 | 80 | $BaCO_3$ |
|  |  | Cu | 23 | N.D. |  | $CaCO_3 + Mg(OH)_2$ |
|  |  | Ni | 37.5 | N.D. |  | $CaCO_3 + Mg(OH)_2$ |
|  |  | Zn | 77 | N.D. |  | $CaCO_3 + Mg(OH)_2$ |
|  |  | $CN^-$ | 223.9 | N.D. |  | CuCl |
| 12 | plating | Cr | 50 | 0.2 | 100 | $BaCO_3$ |

TABLE II-continued

| Ex. | INDUSTRY | IONS TO BE REMOVED | ORIGINAL CONCENTRATION mg/l | FINAL CONCENTRATION mg/l | FLOW RATE 1/mn | SPARINGLY SOLUBLE SALT USED FOR TREATMENT |
|---|---|---|---|---|---|---|
| | | Ni | 75 | N.D. | | $BaCO_3$ + $Mg(OH)_2$ |

NOTE 1:
Treatment was carried out in line by passing the waste waters first through a first container containing CuCl to remove $CN^-$ and then through a second container containing $CaCO_3$ + $Mg(OH)_2$ either alone or in admixture with $BaCO_3$ to remove the metal ions.

NOTE 2:
The waste waters to be treated were first processed as is known in the art to separate the different metal ions. Then, the resulting solutions each containing a given metal, were treated separately with a sparingly soluble salt or mixture of salts adapted to the metal to be removed.

We claim:

1. A method for treating an aqueous solution containing ions to be removed in order to remove said ions from said solution in a continuous manner, comprising the step of passing a neutral aqueous solution containing the ions to be removed through a container containing at least one metal salt that is sparingly soluble in water and that will slightly dissolve in the aqueous solution to form a saturated solution of ions that will permanently react with the ions to be removed to form therewith another salt which is substantially insoluble in water and will precipitate, said precipitation disturbing the equilibrium between the dissolved ions of the sparingly soluble metal salt and said sparingly soluble metal salt in undissolved form, thus causing more of said sparingly soluble metal salt to dissolve and react with the ions to be removed, said neutral aqueous solution being passed through the container at such a speed as to provide contact of said ions to be removed with said sparingly soluble salt for a period of time sufficient to allow said other substantially insoluble salt to be formed, wherein said ions to be removed and said sparingly soluble salt used for the removal thereof are selected from at least one of the following groups:

(a) the ion to be removed is $CN^-$ and the sparingly soluble salt is $CuCl$, $CuC_2O_4 \cdot \frac{1}{2}H_2O$, $NiCO_3$, $ZnCO_3$ or a combination thereof;

(b) the ion to be removed is $PO_4^{-3}$ and the sparingly soluble salt is a mixture of $CaCO_3$ and $Mg(OH)_2$;

(c) the ion to be removed is $Al^{+3}$ and the sparingly soluble salt is $Mg(OH)_2$, $Ca_3(PO_4)_2$, $BaC_2O_4$, $CuC_2O_4$ or a combination thereof;

(d) the ion to be removed is $Ag^+$ and the sparingly soluble salt is $CuCl$;

(e) the ion to be removed is $Ba^{+2}$ and the sparingly soluble salt is $Ca_3(PO_4)_2$, $CaSiO_3$ or a combination thereof;

(f) the ion to be removed is $Be^{+2}$ and the sparingly soluble salt is $BaCO_3$, $CaCO_3$, $FeCO_3$, $MgCO_3$, $MnCO_3$ or a combination thereof;

(g) the ion to be removed is $Bi^{+3}$ and the sparingly soluble salt is $BaCO_3$, $CaCO_3$, $FeCO_3$, $MgCO_3$, $MnCO_3$, $Mg(OH)_2$ or a combination thereof;

(h) the ion to be removed is $Cd^{+2}$ and the sparingly soluble salt is $BaCO_3$, $CaCO_3$, $FeCO_3$, $MgCO_3$, $MnCO_3$, $Ca_3(PO_4)_2$ or a combination thereof;

(i) the ion to be removed is $Ce^{+3}$ and the sparingly soluble salt is $BaCO_3$, $CaCO_3$, $FeCO_3$, $MgCO_3$, $MnCO_3$, $Ca_3(PO_4)_2$ or a combination thereof;

(j) the ion to be removed is $Co^{+2}$ and the sparingly soluble salt is $BaCO_3$, $CaCO_3$, $FeCO_3$, $MgCO_3$, $MnCO_3$, $Mg(OH)_2$, $CaSO_3$ or a combination thereof;

(k) the ion to be removed is $CrO_4^{-2}$ and the sparingly soluble salt is $BaCO_3$;

(l) the ion to be removed is $Cr_2O_4^{-2}$ and the sparingly soluble salt is $BaCO_3$, $BaC_2O_4$, $CaCO_3$, $CaSiO_3$, $CaSO_3$, $FeCO_3$, $MgCO_3$, $Mg(OH)_2$, $MnCO_3$ or a combination thereof;

(m) the ion to be removed is $Cu^+$ or $Cu^{+2}$ and the sparingly soluble salt is $BaCO_3$, $CaCO_3$, $FeCO_3$, $MgCO_3$, $MnCO_3$, $Mg(OH)_2$, $CaSO_3$ or a combination thereof;

(n) the ion to be removed is $Fe^{+2}$ or $Fe^{+3}$ and the sparingly soluble salt is $Mg(OH)_2$, $Ca_2(PO_4)_2$ or a combination thereof;

(o) the ion to be removed is $Hg^+$ or $Hg^{+2}$ and the sparingly soluble salt is $BaCO_3$, $CaCO_3$, $FeCO_3$, $MgCO_3$, $MnCO_3$, $CuCl$ or a combination thereof;

(p) the ion to be removed is $Mg^{+2}$ and the sparingly soluble salt is $Ca_3(PO_4)_2$;

(q) the ion to be removed is $Mn^{+2}$ and the sparingly soluble salt is $Ca_3(PO_4)_2$;

(r) the ion to be removed is $Ni^{+2}$ and the sparingly soluble salt is $BaCO_3$, $CaCO_3$, $FeCO_3$, $MgCO_3$, $MnCO_3$, $Ca_3(PO_4)_2$, $BaC_2O_4$, $CaC_2O_4$, $CaSO_3$ or a combination thereof;

(s) the ion to be removed is $Pb^{+2}$ and the sparingly soluble salt is $BaCO_3$, $CaCO_3$, $FeCO_3$, $MgCO_3$, $MnCO_3$, $Ca_3(PO_4)_2$, $BaC_2O_4$, $CaC_2O_4$, $CaSO_3$ or a combination thereof;

(t) the ion to be removed is $Pt^{+2}$ and the sparingly soluble salt is $Mg(OH)_2$;

(u) the ion to be removed is $Sn^{+2}$ and the sparingly soluble salt is $Ca_3(PO_4)_2$;

(v) the ion to be removed is $Sr^{+2}$ and the sparingly soluble salt is $Ca_3(PO_4)_2$;

(w) the ion to be removed is $Th^{+4}$ and the sparingly soluble salt is $BaCO_3$, $CaCO_3$, $FeCO_3$, $MgCO_3$, $MnCO_3$, $BaC_2O_4$, $CuC_2O_4$ or a combination thereof; or (x) the ion to be removed is $Zn^{+2}$ and the sparingly soluble salt is $Ca_3(PO_4)_2$.

2. The method of claim 1, comprising the additional step of replacing the container by another container containing the same sparingly soluble salt as soon as all of the sparingly soluble salt contained in said container has reacted with said ions to be removed.

3. The method of claim 2, wherein the neutral solution is contacted with a mixture of at least two sparingly soluble salts in order to simultaneously remove at least two different ions.

4. The method of claim 3, wherein the ions to be removed are selected from the group consisting of $Al^{+3}$, $Cr_2O_4^{-2}$, $CrO_4^{-2}$, $Cu^+$, $Cu^{+2}$, $Fe^{+2}$, $Fe^{+3}$, $Ni^{+2}$, $Pb^{+2}$, $Sn^{+2}$, $Sr^{+2}$ and $Zn^{+2}$ and the sparingly soluble salt mixture used for removing said ions comprises at least two salts selected from the group consisting of $CaSO_3$, $CaCO_3$, $Mg(OH)_2$, $BaCO_3$ and $BaC_2O_4$.

5. The method of claim 4, wherein said sparingly soluble salt mixture is a mixture of $CaCO_3$, $Mg(OH)_2$ and $BaCO_3$.

6. The method of claim 2, comprising the additional step of
repeating said passing step at least once with another sparingly soluble salt capable of reacting with other ions contained in the solution in order to remove said other ions.

7. The method of claim 2, wherein the ions to be removed are selected from the group consisting of $Al^{+3}$, $Cr_2O_4^{-2}$, $CrO_4^{-2}$, $Cu^+$, $Cu^{+2}$, $Fe^2$, $Fe^{+3}$, $Ni^{+2}$, $Pb^{+2}$, $Sn^{+2}$, and $Zn^{+2}$ and the sparingly soluble salt used for removing said ions is selected from the group consisting of $CaSO_3$, $CaCO_3$, $Mg(OH)_2$, $BaCO_3$ and $BaC_2O_4$.

8. The method of claim 1, wherein said neutral aqueous solution containing the ions to be removed is produced by neutralizing an acidic aqueous solution containing said ions.

* * * * *